(12) United States Patent
Tian et al.

(10) Patent No.: US 9,166,947 B1
(45) Date of Patent: Oct. 20, 2015

(54) MAINTAINING PRIVATE CONNECTIONS DURING NETWORK INTERFACE RECONFIGURATION

(71) Applicant: Amazon Technologies, Inc., Reno, NV (US)

(72) Inventors: Hong Tian, Seattle, WA (US); Chengliang Zhang, Sammamish, WA (US); Padmini Chandrasekhar Iyer, Redmond, WA (US); Ajith Jayamohan, Redmond, WA (US); Eric Wayne Schultze, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 13/683,970

(22) Filed: Nov. 21, 2012

(51) Int. Cl.
*G06F 15/177* (2006.01)
*H04L 29/12* (2006.01)

(52) U.S. Cl.
CPC .................................. *H04L 61/255* (2013.01)

(58) Field of Classification Search
CPC ... H04L 63/20; H04L 61/304; H04L 61/2007; H04L 61/6068; H04L 47/70; H04L 41/00
USPC .................. 709/220, 221, 222, 223, 224
See application file for complete search history.

(56) References Cited

U.S. PATENT DOCUMENTS

| 7,210,147 | B1* | 4/2007 | Hipp et al. ..................... 719/312 |
| 2009/0288084 | A1* | 11/2009 | Astete et al. ..................... 718/1 |
| 2011/0246669 | A1* | 10/2011 | Kanada et al. ................. 709/238 |
| 2012/0257628 | A1* | 10/2012 | Bu et al. ......................... 370/392 |
| 2014/0195666 | A1* | 7/2014 | Dumitriu et al. .............. 709/223 |

* cited by examiner

*Primary Examiner* — Liangche A Wang
*Assistant Examiner* — Cheikh Ndiaye
(74) *Attorney, Agent, or Firm* — Baker & Hostetler LLP

(57) ABSTRACT

A request is received to change an association of a network interface record from a first resource instance to a second resource instance. The network interface record may include an IP address associated with the first resource instance. In response to the request, the first resource instance is prevented from receiving data packets addressed to the IP address of the network interface record through a first network interface object attached to the first resource instance. The network interface record is associated with the second resource instance so that the second resource instance is enabled to receive data packets addressed to the IP address of the network interface record through a second network interface object attached to the second resource instance.

18 Claims, 6 Drawing Sheets

MAINTAINING PRIVATE CONNECTIONS DURING NETWORK INTERFACE RECONFIGURATION

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

Operators of data centers that provide different types of virtualized computing, storage, and/or other services typically use standard networking protocols to receive customer requests and transmit responses to such requests using commodity network hardware such as network interface cards (NICs). Despite recent advances in virtualization technology, many networking-related properties of virtual servers are typically managed at the level of individual physical network interface cards.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Embodiments of systems and methods are described for reassigning private network addresses from a first computing resource to a second computing resource with minimal or no service interruption. In a virtual private network environment, virtual network objects can have multiple private addresses (for example, private IP addresses) that are only known to the computers in the virtual private network. In order to communicate with computers outside of the virtual private network, the private addresses can be associated with public addresses that are known to the outside world. A gateway device situated between the virtual private network and the outside public network may perform network address translation for data traffic between the public network and the virtual private network.

In various embodiments, a private address may be assigned to a virtual network object. The private address may subsequently be un-assigned or disassociated from the virtual network object and reassigned to another virtual network object. The new virtual network object may be installed on the same computing device or another computing device. Existing connections between public addresses and the private address are maintained during the re-assignment. A user in the public network connected to the virtual private interface need not be aware of the re-assignment. According to an example use case, customers may re-assign private addresses of faulty computing resources to replacement computing resources with minimum service interruptions.

Figure 1:
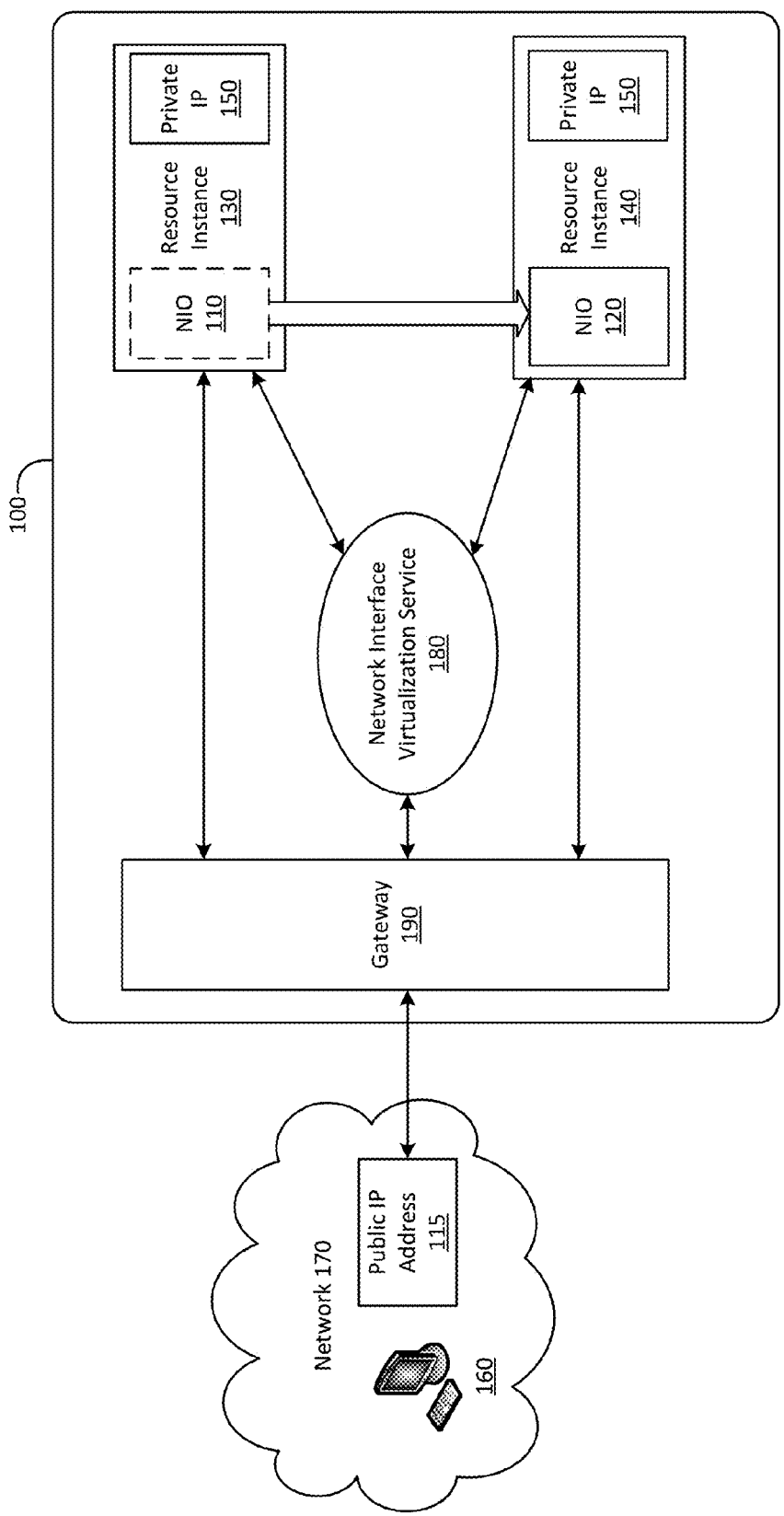
FIG. 1 is a diagram illustrating a mechanism for reassigning computing resources in accordance with the present disclosure.

FIG. 1 is a diagram illustrating a system 100 including a mechanism for providing a network interface virtualization service in accordance with the present disclosure. In FIG. 1, system 100 for providing computing resources is described according to an embodiment. System 100 may correspond, for example, to a data center as described herein. System 100 may include virtual resource instances 130 and 140 that may execute on one or more server computers. Furthermore, resource instances 130 and 140 may have associated, for example, virtual network objects (NIOs) 110 and 120. It will be appreciated that some embodiments may involve additional resource instances that may be instantiated on the same or additional server computers.

FIG. 1 also illustrates public network 170 that may include one or more computers such as computer 160. According to one embodiment, resource instance 130 may be configured to provide computing services to a computer user such as computer 160 of public network 170 via gateway 190. For example, resource instance 130 may provide a set of remote access enterprise applications to a group of users who may, for example, be employees of an enterprise customer. Furthermore, resource instance 130 may be associated with a private IP address 150 that is associated with public IP address 115. Incoming data addressed to public IP address 115 may be network address translated (NAT'd) by gateway 190 to private IP address 150. Within system 100, private IP address 150 may be associated with or attached to resource instance 130 via NIO 110. The association between NIO 110 and resource instance 130 may be tracked and managed by a computing network interface virtualization service 180.

In some cases a customer user of resource instance 130 may wish to remap its allocated private IP address 150 from resource instance 130 to resource instance 140. In one embodiment, system 100 may provide the ability to change the mapping of private IP address to different resource instances that in turn may be mapped to one or more public IP addresses. Such a feature may be useful, for example, to allow a user to respond to changes in computing requirements or to respond to resource failures. In other embodiments, an administrator of system 100 may remap resource instances to reallocate resources, upgrade services, upgrade hardware and/or software, and other reasons. Thus for various reasons a change of the association of private IP address 150 from resource instance 130 to resource instance 140 may be requested. Network interface virtualization service 180 may disassociate or detach private IP address 150 from NIO 110 and associate or attach private IP address 150 to NIO 120. Network interface virtualization service 180 may process and track the changes. By updating and maintaining information regarding associations between private IP addresses and the NIOs, network interface virtualization service 180 can efficiently enable private IP addresses to be reassigned to different resource instances with minimum service interruptions.

In one example, a user may desire to remap an existing virtual machine instance in a virtual private network to a virtual machine instance with increased memory capacity and loaded with an updated set of applications. The user may launch the virtual machine instance in the virtual private network and remap its associated private IP address from the previous virtual machine instance to the new virtual machine instance. As explained previously, a device such as gateway 190 of FIG. 1 may be configured to translate the allocated public IP address to a corresponding private IP address of a virtual machine instance. When the user remaps the private IP address to the new virtual machine instance, network interface virtualization service 180 may update its stored information so that data traffic addressed to the private IP address will now be delivered to the new virtual machine instance.

Referring back to FIG. 1, one drawback of remapping of the private IP address from resource instance 130 to resource instance 340 is that existing user connections that are active at the time of the remapping may be broken. For example, if a connection to resource instance 130 is active, a remapping of private IP address 150 of resource instance 130 to resource instance 140 may result in a loss of mapping of data between public IP address 115 and private IP address 150. Although the connection can be resumed between public IP address 115 and private IP address 150, the loss and reestablishment of the connection can be disruptive to the user and result in a poor customer experience.

According to an embodiment, a data center customer can request a remapping of an allocated private IP address in a virtual private network from a first resource instance to a second resource instance while maintaining existing connections between the private IP address and the corresponding public IP address.

Various aspects of the disclosure are described with regard to certain examples and embodiments, which are intended to illustrate but not to limit the disclosure.

A data center may provide one or more services accessible via the Internet such as various types of cloud-based computing or storage to a distributed set of clients. The data center may host various resource pools, such as collections of physical and virtualized computer servers, storage devices, networking equipment and the like, needed to implement and distribute the services offered by the data center. The data center may also provide private and isolated sections of its data services in which a customer may launch computing resources in a virtual network defined by the user.

To enhance the flexibility with which different sets of resources may be accessed without having to resort to cumbersome security setting modifications, reconfiguring and/or physically moving network interface cards, in some embodiments an operator of a provider network may set up a set of virtualization services for network interfaces. Such services may be enabled and managed by a network interface virtualization service responsible for maintaining and implementing various operations on a set of network interface records to manage networking operations required to access various resources of the provider network.

In some embodiments, different parts of the functionality of the network interface virtualization service may be incorporated within several different cooperating software components and/or devices, such as modules of hypervisor or operating system software running on various hardware platforms of the provider network, router software on edge devices, and the like.

In one embodiment, the data center may provide customers with one or more instances of virtualized computer resources and/or storage resources, each of which may require network addressability to allow the customers to interact with the resources. The network interface virtualization service in such an implementation may allow a customer to request that a modifiable and transferable network interface record be created, which includes various elements of networking configuration information (such as security policies, addressing information, and routing information) that the customer wishes to set up and then associate and disassociate as desired with various resource instances over time. A network interface record may in some embodiments include one or more Internet Protocol (IP) addresses and a subnet identifier for a subnet to which the IP address or addresses belong. In addition, various security-related settings may be included in the network interface records, identifying, for example, which entities or users are allowed to perform the "attach" and "detach" operations described in further detail below.

The network interface virtualization service may create the requested interface record and in one embodiment store it in a persistent repository or database of interface records. The customer may in some embodiments request that the network interface virtualization service "attach" the network interface record to a resource instance such as a virtualized computer server or storage server, thereby enabling the resource instance to receive incoming traffic directed at an IP address of the network interface record, and enabling outbound traffic from the resource instance to indicate that it originated at that IP address.

The network traffic may flow over one or more physical network interface cards (NICs) that are installed at a physical platform on which the virtualized resource instance may currently be instantiated, but the properties of the interface record may be considered to be independent of any particular NIC or NICs and independent of any particular resource instance. At a given point in time, for example, an interface record may or may not be associated with (i.e., "attached" to) a resource instance. During a period when it is not associated with any resource instance, the interface record may exist in an inactive or quiescent mode within the network interface virtualization service's repository of interface records while retaining its properties.

In response to a request to "detach" an interface record from a resource instance to which it currently is attached, the network interface virtualization service may ensure that traffic directed to the IP address or addresses of the interface record no longer reaches the resource instance in some embodiments. The customer may also request that the network interface virtualization service now attach the interface record to a different resource instance (such as a different virtualized computer server) than the instance to which it was previously attached. This new attachment operation may then result in IP traffic targeted at the IP address(es) included within the interface record reaching the newly attached resource instance, using whichever set of physical NICs is appropriate, thus allowing the customer to easily transfer network configuration settings and associated security settings across resource instances without dealing with physical NICs directly. Various other operations such as modifications of IP addresses associated with a given interface record, modifications of security settings, billing-related operations and the like may be supported by the virtual network object coordinator in various embodiments.

In some embodiments, a customer may define a virtual network topology for a computing network and define parameters such as an IP address range, create subnets, and define configurations of routing tables and network gateways. Thus a user may, for example, create a publicly accessible subnet for one or more servers that can access the Internet, and situate backend systems such as databases or application servers in a private-facing subnet with no Internet access. The user may implement one or more layers of security mechanisms such as security groups and network access control lists to control access to resources in each subnet.

A user may launch virtual instances that may be assigned an internal and external IP address. External IP addresses may provide connectivity to the Internet while internal IP addresses may be used to allow instances to communicate with one another. Virtual instances may include a virtual network object that is assigned a private IP address on the virtual private network. Additional virtual network objects can be created and associated with virtual instances. A virtual network object may, in some embodiments, correspond to a physical NIC, a virtualized NIC, or a subset of a physical NIC or a virtualized NIC.

Virtual network objects, for example, may comprise a primary private IP address, one or more secondary private IP addresses, a public IP address, a MAC address, membership in specified security groups, a description, and a source/destination check flag. In some embodiments, a virtual network object may be associated with a virtual instance and later disassociated from the virtual instance. The virtual network object may then be associated with another virtual instance. In one embodiment, the virtual network object and its associated private IP address, any secondary private IP addresses, public IP addresses, and MAC address may be configured to follow the virtual network object as it is attached or detached from a virtual instance and reattached to another virtual instance.

For example, a user may create a virtual private network that includes virtual instances that utilize one or more virtual network objects. The user may configure the network so that a first virtual network object handles public-facing traffic. The user may also configure the virtual private network to include a second virtual network object to handle back-end management traffic that is connected to a separate subnet in the virtual private network with different security access controls. The first virtual network object may have an associated security group allowing access to the server from the Internet. The second virtual network object may have an associated security group allowing secured access only from an allowed range of IP addresses either within the virtual private network or from the Internet, a private subnet within the virtual private network, or a virtual private gateway.

In some cases, a failure or other unexpected behavior in a computing resource may necessitate a re-assignment of the resource in order to respond to the failure. In the event of an instance failure, a user may move the virtual network object to another instance. In one embodiment, the virtual network object may maintain its private IP addresses, public IP addresses, and MAC address, and allow for data traffic to flow to the new instance without any loss of connectivity.

Figure 2:
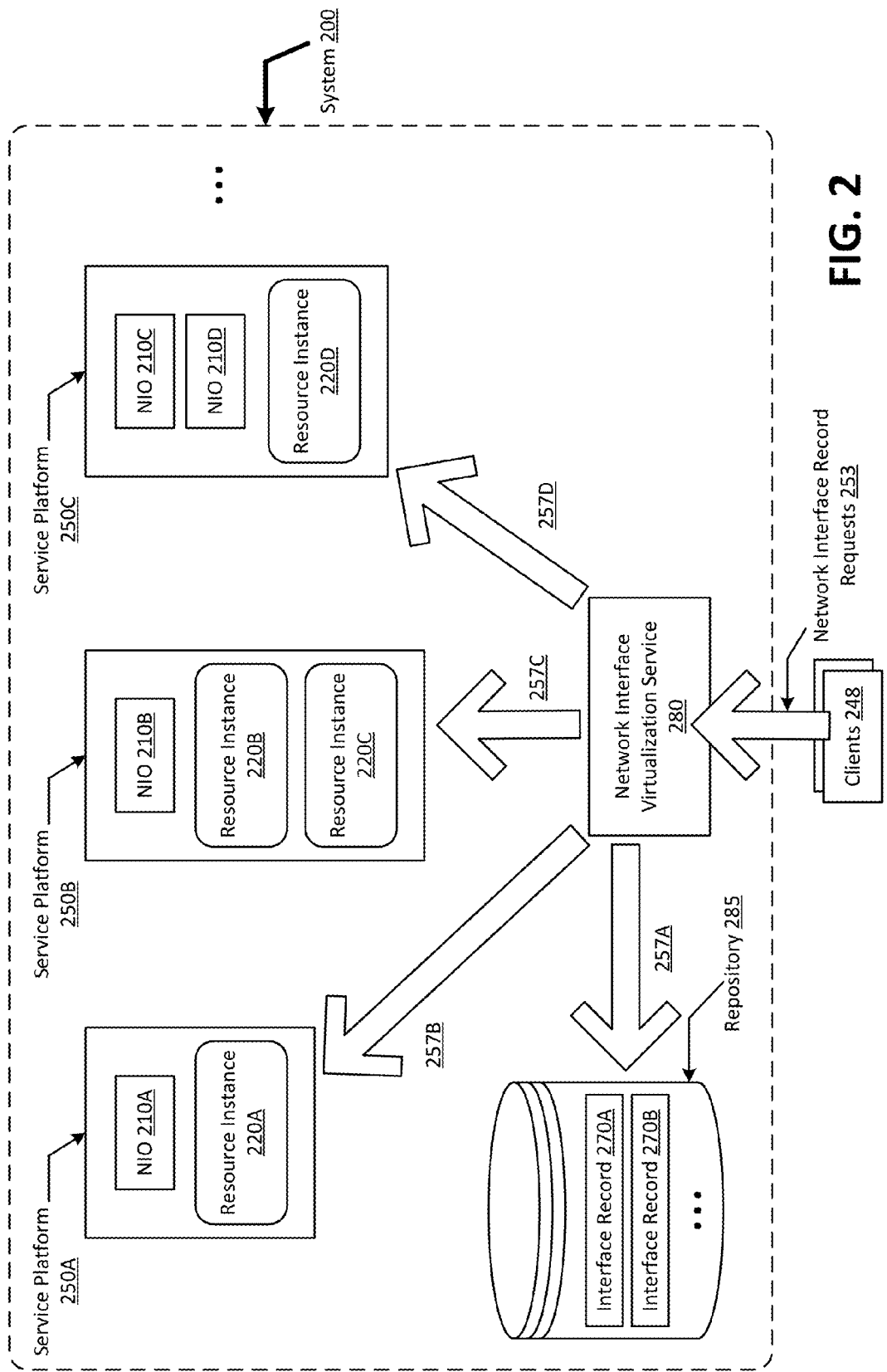
FIG. 2 is a diagram illustrating a mechanism for reassigning computing resources in accordance with the present disclosure.

FIG. 2 illustrates an example system environment for reassigning computing resources. A system 200 may include a plurality of resource instances 220, e.g., instances 220A, 220B, 220C, and 220D of a provider network configured to provide various types of services to clients 248 such as cloud computing services or cloud storage services. Clients 248 may in turn implement a variety of services on instances 220 such as web sites with associated back-end databases and expose them to their own customers. Resource instance 220 may, for example, implement a virtualized service such as a virtual computing system or a virtual storage system that is resident on one or more physical platforms such as service platforms 250A, 250B, and 250C of FIG. 2.

A service platform 250 for a resource instance 220 that provides a virtual computing system may, for example, include a hardware server with one or more CPUs as well as associated memory, storage and networking hardware. Service platform 250 may also include software such as a hypervisor and/or elements of an operating system that implements the virtualization of the computing system. Similarly, a service platform 250 that provides a virtual storage system may comprise portions or all of one or more hardware storage devices such as disk arrays or storage appliances and the associated processing elements and software.

In some embodiments, resource instances 220 may be transferable from one platform 250 to another. For example, a virtual computing system may initially be brought up on one physical server and later moved to another physical server.

Furthermore, multiple resource instances may be resident on one service platform 250. For example, resource instances 220B and 220C are shown resident on service platform 250B. The physical resources (e.g., CPUs and network cards) of a service platform 250B with multiple resident resource instances 220 may be distributed using a variety of schemes in different embodiments. Resource instances 220 may correspond to resource instances 130 and 140 in FIG. 1. In one embodiment some of the resources may be allocated exclusively to the resource instances (e.g., if the service platform 250B has four CPUs, two CPUs may be allocated to resource instance 220B while the other two CPUs may be allocated to resource instance 220C). In another embodiment, the physical resources may be shared using time slices. For example, all four CPUs may be usable by either resource instance with a scheduling mechanism set up to decide how CPU cycles within a given time slice are to be distributed among the instances as a function of their computing demands. In the embodiment illustrated in FIG. 2, each service platform 250 may have one or more physical network interface objects (NIOs)—service platform 250A has NIO 210A, service platform 250B has NIO 210B, and service platform 250C has NIOs 210C and 210D. In various embodiments, a NIO may be a virtualized NIC or may refer to a physical NIC. A NIO may also refer to a subset of features of a virtualized NIC or a physical NIC. The network traffic flowing to and from a resource instance 220 that happens to be resident on a given service platform 250 flows through one or more of the NIOs 210 of the service platform. In some implementations a single resource instance 220 may span multiple hardware service platforms 250, in which case any of the NIOs 210 available on any of the multiple service platforms 250 may be used. In one embodiment, resource instance 220 may comprise a non-virtualized server, i.e., a resource instance may be implemented using a conventional operating system running on a bare hardware service platform 250 instead of using hypervisor software.

System 200 may include network interface virtualization service 280 operable to provide a set of virtualization services for network interfaces in the illustrated embodiment. Clients 248 may submit various types of requests 253, including requests to create interface records 270, to attach the interface records 270 to resource instances 220, detach the interface records 270, modify the interface records 270, query the interface records 270, and so on. In response to a given request 253, network interface virtualization service 280 may perform various operations that may affect interface records 270 and resource instances 220 on service platforms 250, as indicated by the arrows labeled 257A, 257B, 257C, and 257D. For example, the network interface virtualization service 280 may, in response to create requests from clients 248, generate interface records such as 270A and 270B that may each contain a set of networking-related properties that can be associated and disassociated on demand with various resource instances 220. The interface records 270 may be generated in a set of in-memory data structures, and may be stored in a repository 285 such as a database on persistent storage. An interface record for a network that uses TCP/IP protocols may include, for example, one or more IP addresses, one or more subnet identifiers of the subnets that contain the IP address or addresses, and a set of security properties described in further detail below. In some implementations interface record 270 may also include one or more other fields such as various status fields, source and destination address check settings, billing-related information, an identification of a currently associated resource instance 220, the Media Access Control (MAC) address of a NIO 210 currently associated with the interface record, and the like. Interface records for networks employing network protocols other than TCP/IP may include network address-related information appropriate for the protocol used.

In some embodiments, network interface virtualization service 280 may be configured to perform "attach" operations to dynamically associate interface records 270 with resource instances 220 and to thereby enable traffic to flow to and from the resource instances 220 in accordance with the networking and security properties specified in the interface records 270. In response to an attachment request 253 received from a client 248, for example, network interface virtualization service 280 may perform some or all of the following operations: (a) validate, based on the security information stored in the specified interface record 270 and/or elsewhere, that the client is authorized to request the attachment of the interface record with the specified resource instance 220; (b) verify that the networking information (IP address or addresses, subnet identifier, etc., of the interface record is appropriate for activation of network traffic to and from the specified resource instance 220 (e.g., the network interface virtualization service 280 may check whether an IP address is already in use for another instance and, therefore, is unavailable); (c) ensure that a NIO 210 is operational and available for use by the resource instance 220 at the service platform 250 where the resource instance 220 is currently residing; (d) initiate or make the necessary configuration changes, e.g., in hypervisor or operating system software running at the service platform 250 and at the appropriate routers, gateways and other network devices of the provider network to allow the specific resource instance 220 to begin to send traffic from, and receive traffic at, the IP address or addresses specified in the interface record; and (e) make changes to the interface record 270 and/or repository 285 to reflect the attach operation performed. As part of the configuration changes, new or modified routing information such as routing table entries may be propagated to a set of routers, gateways, and the like in some implementations. In one embodiment the network interface virtualization service 180 may ensure that each resource instance 220 has at least one interface record 270 attached to it whenever the resource instance is activated or brought up.

Network interface virtualization service 280 may also be operable to "detach" or disassociate interface record 270 from resource instance 220 to which it is currently attached. In response to a detachment request 253 from a client 248, network interface virtualization service 180 may prohibit further traffic directed to or from the IP address or addresses specified in interface record 270 from flowing to or from the resource instance. In order to do so, network interface virtualization service 280 may perform some or all of the following operations: (a) validate, based on the security information stored in interface record 270 and/or elsewhere, that the client is authorized to request the detachment of the interface record from resource instance 220; (b) initiate or make the necessary configuration changes, e.g., within hypervisor or operating system software running at service platform 250 and at the appropriate routers, gateways, and other network devices, to prevent network traffic associated with the IP address(es) of interface records 270 from flowing to or from resource instance 220; and (c) make changes to interface record 270 and/or repository 285 to reflect the detach operation performed.

An interface record 270 that was previously attached to a particular resource instance 220, and then detached from that resource instance 220, may later be attached to any desired resource instance (either a different resource instance, or the same resource instance to which it was previously attached) by network interface virtualization service 280 at the request of a client. In such embodiments the same IP address may be used during a first "attachment period" to send and receive traffic at one resource instance 220A through a particular NIO 210A, and then during a subsequent "attachment period" to send and receive traffic at a different resource instance 220B, potentially through a different NIO 210B and/or at a different service platform 250. In addition to allowing clients to map a given IP address to different resource instances 220 at different times, network interface virtualization service 280 may also allow the client to reuse some or all of the security settings associated with interface record 270, thus substantially reducing the effort and complexity required for making networking configuration changes. In many embodiments multiple interface records 270 may be attached to a single resource instance 220, thus allowing multiple IP addresses to be used for the same resource instance. In some implementations a single interface record 270 may be attached to multiple resource instances 220 at the same time. For example, network interface virtualization service 280 may be capable of distributing or load-balancing traffic directed at a single IP address specified in interface record 270 across two or more resource instances 220. Using these capabilities of network interface virtualization services 280, a highly flexible mapping of IP addresses, subnets, and network security settings to resource instances 220 may be implemented in various embodiments.

Figure 3:
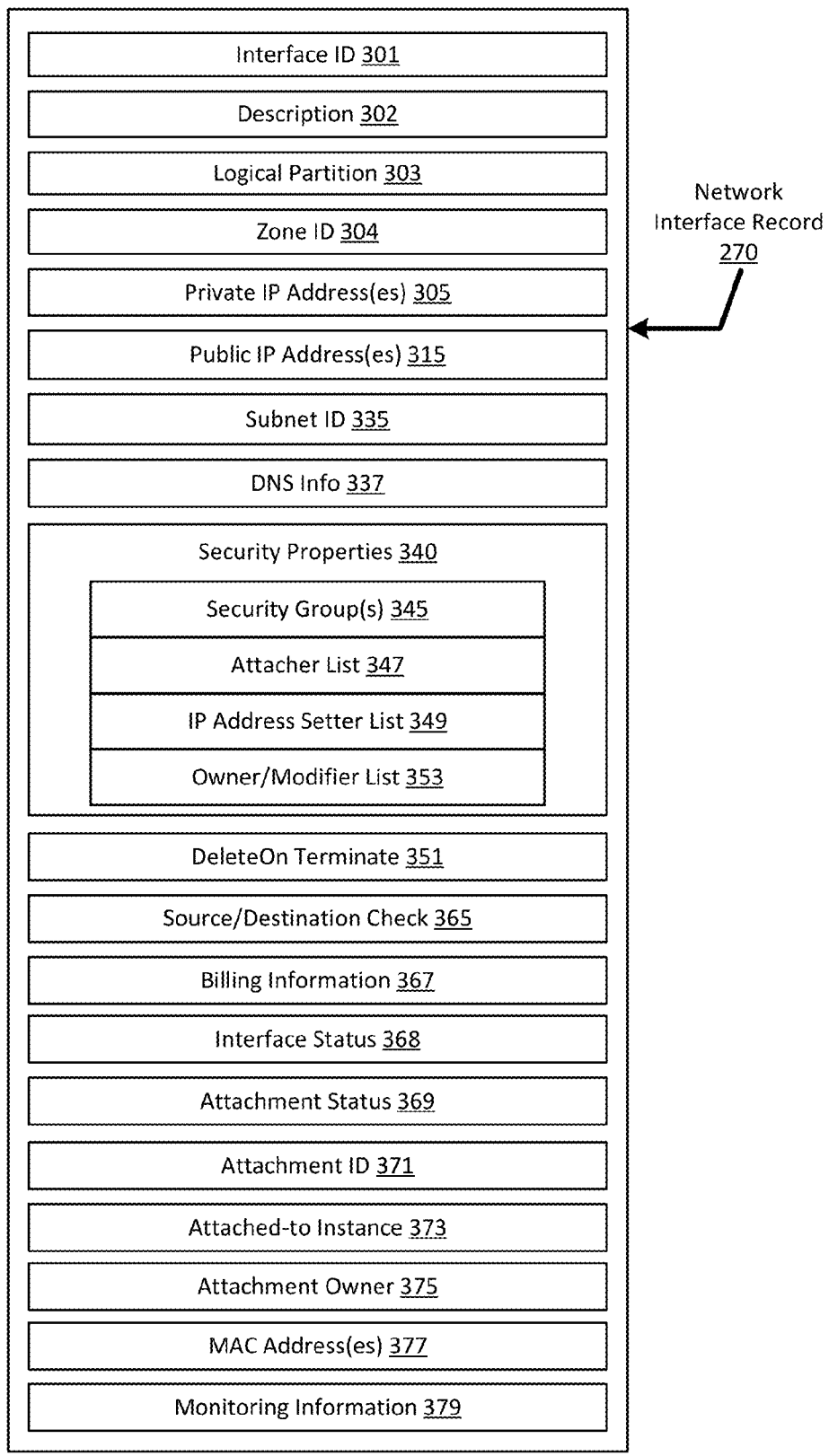
FIG. 3 is a diagram illustrating an interface record in accordance with the present disclosure.

FIG. 3 illustrates an example of an interface record 270. A subset of the elements or fields shown in FIG. 3 may be implemented in some embodiments, and not all the implemented fields may be populated. When an interface record 270 is created, a new interface identifier 301 may be created. In some embodiments, a description field 302 may be provided by client 248. A provider network in which the interface record is to be used may comprise a plurality of logical partitions in some embodiments, and the interface record 270 may contain logical partition identifier 303 in such cases. For example, the operator of the provider network may establish a logical partition for a particular customer by setting aside a set of service platforms 250, a set of network address ranges, other equipment or resources, and network administration capabilities for exclusive use by that customer, effectively providing the customer with an isolated and private data center.

A logical partition may include resources that are geographically distributed in some embodiments, thereby providing the customer the benefits of access to a virtual private network of resources. In some cases interface record 270 may include a zone identifier 304, which may for example indicate a geographical region or set of data centers whose service platforms 250 may be available for attachment to the interface record 270.

Any of several types of network addressing-related fields may be included within an interface record 270 in different embodiments. One or more private IP addresses 305 may be specified for the interface record in some embodiments. Private IP addresses 305 addresses may be used internally for routing within the provider network, and may not be directly accessible from outside the provider network. One or more public IP addresses 315 may also be included in some embodiments. Public IP addresses 315 may be visible outside the provider network. Various devices or components, including, for example, components of network interface virtualization service 180 of FIG. 1 or network interface virtualization service 280 of FIG. 2, may implement any desired network address translation technique or techniques to translate between public IP addresses 315 and private IP addresses 305 in various embodiments as needed. One or more subnet identifiers 335 may be included within an interface record.

The term subnet, as used herein, is a logically visible subdivision of a network. In the case of IP networks, the set of logical or physical devices that belong to a subnet may be addressed with a common, identical, most-significant bit-group in their IP address. This results in the logical division of an IP address into two fields, a network or routing prefix and the "rest" field. The rest field may serve as a specific identifier for the logical or physical device. The routing prefix may be expressed in Classless Inter-Domain Routing (CIDR) notation, which may be written as the first address of a network followed by the bit-length of the prefix, separated by a slash (/) character. For example, 10.1.1.0/34 is the prefix of an Internet Protocol Version 4 (IPv4) network starting at the address 10.1.1.0, having 34 bits allocated for the network prefix, and the remaining 8 bits reserved for device identification. In IPv4, the routing prefix may also be specified in the form of the subnet mask, which is expressed in quad-dotted decimal representation like an address. For example, 355.355.355.0 is the network mask for the 10.1.1.0/34 prefix. Slightly different notation may be used for IP Version 6 networks and for networks that use protocols other than the TCP/IP suite. Subnets may be used in general for a variety of reasons—for example, to provide logical isolation between different sets of network addressable devices, to arrange the resources of a logical partition (such as a virtual private cloud) into hierarchies for easier administration, and so on. A subnet identifier 335 included within an interface record 270 may comprise, in some implementations, a string that may in turn include or encode the CIDR representation for the subnet (e.g., "subnet-df543fda-10.1.1.0/34"). In one embodiment an identification of a Domain Name Server (DNS) may be included in the interface record 270 as well.

In some embodiments interface record 270 may include security-related properties 340. Some provider networks may allow users to specify rules, including for example firewall-related rules, for the types of incoming and/or outgoing traffic allowed at resource instances 220 to which an interface record 270 may be attached. Such rules may be termed "security groups" and identified via security group(s) fields 345. Various port and protocol restrictions may be enforced using such rules, and multiple rules may be associated with each interface record. For example, a user may use security groups to ensure that only HTTP and HTTPs outgoing or incoming traffic is allowed, to limit the set of TCP or UDP (User Datagram Protocol) ports to which traffic is permitted, to filter incoming and outgoing traffic according to various policies, and so on. In some implementations an attacher list 347 may be specified, indicating which users or entities are allowed to request attachments of the interface record 270 to resource instances 220. In some cases a separate detacher list may be used to specify which entities can detach the interface record 270, while in other cases a single list such as attacher list 347 may be used to identify authorized attachers and detachers. The set of users or entities that are allowed to set or modify IP addresses (e.g., public IP addresses 315 and/or private IP addresses 305) of interface record 270 may be provided in IP address setter list 349, and the set of users or entities that own (or can modify various other fields of) the interface record 270 may be specified in owner/modifier field 353 in some embodiments. For example, an owner/modifier identified in field 353 may be permitted to change the attacher list 347 or the IP address setter list in some implementations, thus changing the set of entities permitted to attach or detach the interface record or modify its IP address(es). While the term "list" has been used for fields 347, 349, and 353, logical data structures other than lists (such as arrays, hash tables, sets, and the like) may be used to represent the groups of entities given various security privileges, roles, and/or capabilities in various embodiments.

In some embodiments, users may be allowed to "terminate" resource instances 220. For example, client 248 may set up virtual computer server resource instances 220, attach interface records 270 to the instances, run a desired set of computations on the instances, and then issue a request to terminate the instances when the desired computations are complete (thus indicating that the resource instances 220 are no longer required). In such embodiments, a "DeleteOnTerminate" setting 351 may be used to specify what happens to attached interface records 270 when a resource instance 220 is terminated. If DeleteOnTerminate is set to "true" for an interface record 270 attached to the resource instance 220 being terminated, network interface virtualization service 280 may delete the interface record 270 (e.g., the record may be removed from repository 285). If DeleteOnTerminate is set to "false," the network interface virtualization service 280 may retain interface record 270, so that it may be attached again to some other resource instance. In one embodiment, when interface record 270 is attached to a resource instance 220, an attachment record separate from the interface record may be created to represent that relationship, and the DeleteOnTerminate property may be associated with the attachment record instead of, or in addition to, being associated with the interface record. In such an embodiment, interface record 270 may include a reference or pointer to the attachment record or records for each of the attachments in which the interface record is currently involved, and different values of "DeleteOnTerminate" may be set for each attachment record. In such an environment, instance record 270, which happens to be unattached to any resource instances 220, may not have a "DeleteOnTerminate" property associated with it as long as it remains unattached. By persisting interface records independent of resource instances in this way, the overhead of setting up various security-related and other properties each time a new instance is activated may be reduced for clients 248.

In one embodiment, interface record 270 may contain routing-related information such as an indication of whether a source and/or destination check 365 is to be performed for network packets transmitted to a resource instance 220 to which interface record 270 is attached. If the source/destination check setting is set to "false" or "off," routing decisions may be made based on a packet's source and destination IP addresses, e.g., the packet may be forwarded from one subnet to another; and if the setting is "true" or "on," the resource instance may not perform routing in some embodiments. Thus, the source/destination field 365 may be used in some embodiments to control whether a resource instance to which the interface record is attached performs routing or gateway functions on packets for which it is not the final destination, or whether it ignores such packets. Other types of routing-related information, such as routing table entries, may also or instead be included in interface records 270 in other embodiments. Billing-related information 367 may be included in some implementations, identifying, for example, the entity or user to be billed for network traffic associated with interface record 270.

The interface status field 368 may be used to indicate a current state of interface record 270 (e.g., whether the interface record is "available," "disabled," or "in repair." Similarly, the attachment status field 369 may be used to indicate whether interface record 270 is currently attached, detached, or in the process of being attached or detached in some embodiments. In one implementation, as described above, a record of an attachment (separate from interface record 270) may be created at the time the corresponding attachment operation is performed, and an identifier or identifiers of the current attachments of interface record 270 may be stored in attachment ID field 371. Identifiers of resource instance or instances 220 to which the interface record 270 is currently attached may be stored in attached-to instance field 373, and the user or entity that requested the attachment may be identified via attachment owner field 375 in some embodiments. In one embodiment, a list of identifiers of the NIO or NIOs 210 currently usable for traffic directed to/from the IP addresses of interface record 270 may be maintained, e.g., in the form of a MAC address(es) field 377. In some implementations, monitoring information 379, such as statistics about the amount of traffic flowing to or from the IP addresses of the interface record, may also be retained with the interface record. Other fields not shown in FIG. 3 may be included in interface records 270 in various embodiments. In some embodiments, clients may associate tags, such as a virtual local area network (VLAN) tag formatted in accordance with a VLAN standard (such as the 802.1Q standard) with interface records 270 to implement network isolation. In such embodiments such a tag may also be stored in, or referenced from, interface record 270.

In one embodiment, some of the fields shown in FIG. 3 may be replaced by references or pointers to other objects. For example, security information for interface record 270 may be stored in a separate security object, and the interface record 270 may store a reference to the security object. Similarly, each attachment of resource instance 220 to interface record 270 may be represented by an attachment object, and the interface record may point or refer to the appropriate attachment object in some implementations.

Figure 4:
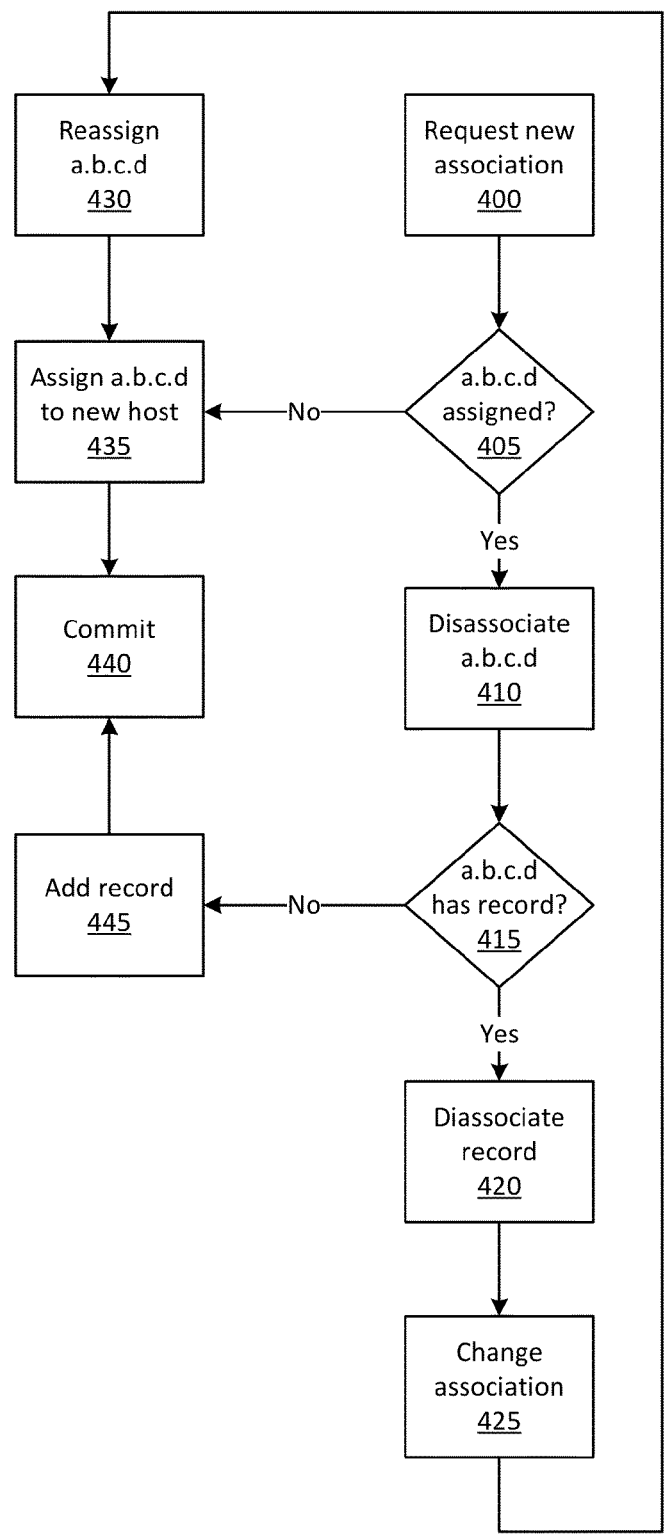
FIG. 4 is a flowchart depicting an example procedure for providing reconfigurable access to computing resources in accordance with the present disclosure.

FIG. 4 illustrates an example operational procedure for reassigning computing resources. In an embodiment, a data center may provide customers with one or more instances of virtualized computer resources and/or storage resources, each of which may require network addressability to allow the customers to interact with the resources. In operation 400, a network interface virtualization service may allow a customer to request a modifiable and transferable network interface record, including a requested private IP address. The network interface virtualization service may correspond to the network interface virtualization service 180 depicted in FIG. 1 and/or the network interface virtualization service 280 depicted in FIG. 2. In operation 405, the network interface virtualization service may determine if the requested private IP address ("a.b.c.d" in this example) has already been assigned. If the requested address has not been assigned, then in operation 435 the network interface virtualization service may create the requested interface record and store it in a persistent repository or database of interface records.

If the requested address has been assigned, then in operation 410 the network interface virtualization service may disassociate address a.b.c.d from the resource instance to which it currently is attached. The network interface virtualization service may ensure that traffic directed to the IP address or addresses of the interface record no longer reaches the resource instance. In operation 415, the network interface virtualization service may determine if the requested private IP address has a network interface record. If the requested private IP address does not have a network interface record, then in operation 445 the network interface virtualization service may create the requested interface record and store it in a persistent repository or database of interface records. If the requested private IP address has a network interface record, then in operation 420 the network interface virtualization service may detach the interface record 420 and change its association 425. The interface record may be attached to a different resource instance 435 (such as a different virtualized computer) than the instance to which it was previously attached using a different NIO as appropriate. The new resource instance may be specifically requested by the user. The new attachment operation may then result in IP traffic targeted at the private IP address reaching the newly attached resource instance, using the new NIO as appropriate. In this way, the customer can easily transfer network configuration settings and associated security settings across resource instances without existing users having to deal with the particular resource instances and associated NIOs directly. Once it is verified that all changes have been correctly entered, then the changes may be committed 440 and brought online.

Figure 5:
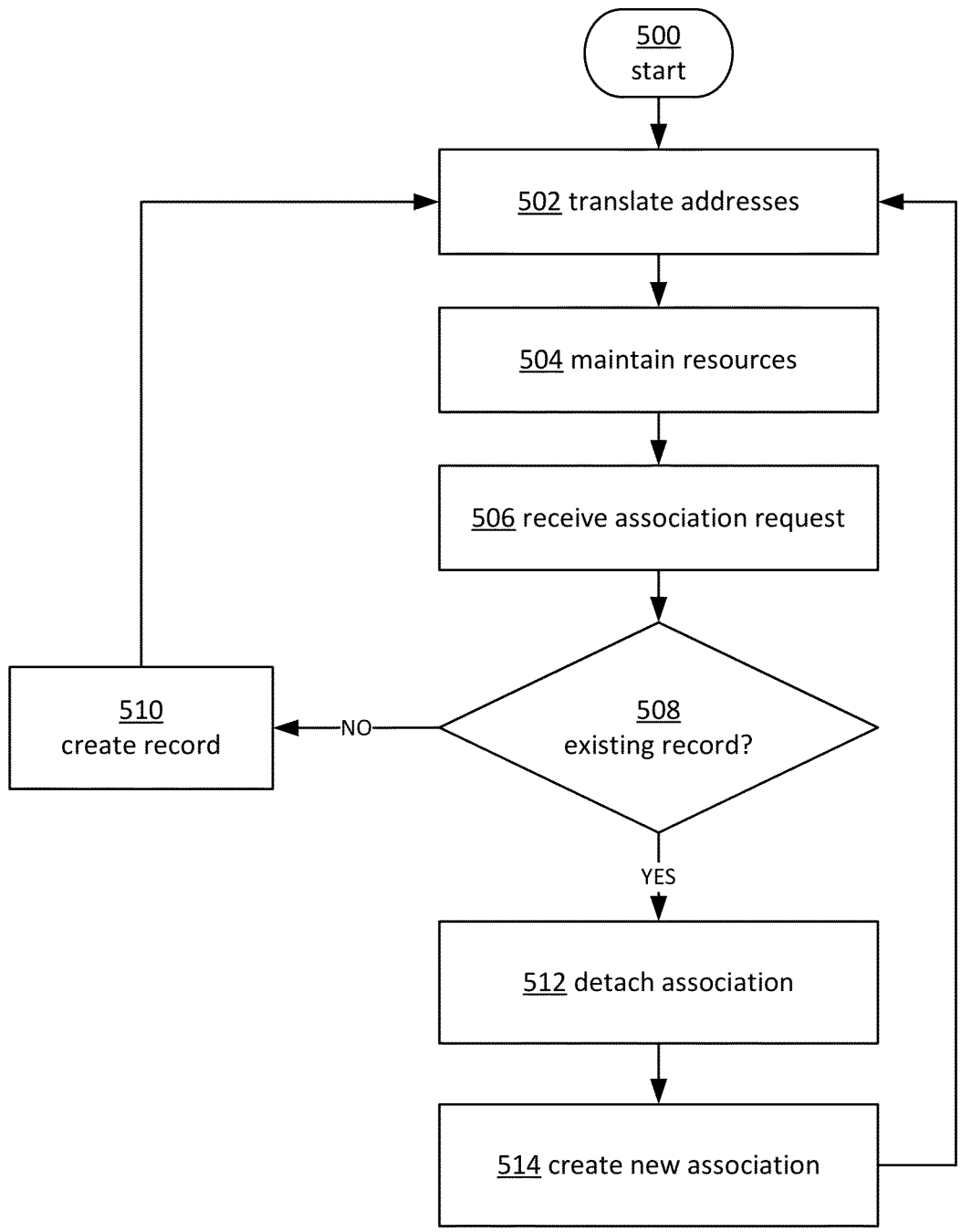
FIG. 5 is a flowchart depicting an example procedure for providing reconfigurable access to computing resources in accordance with the present disclosure.

FIG. 5 illustrates an example operational procedure for reassigning computing resources. In an embodiment, a network gateway device, such as gateway device 190 in FIG. 1 may receive packets and translate the public IP address in the packet's destination address to one of a plurality of private IP addresses on a private network. The plurality of private IP addresses may correspond to respective ones of a plurality of resource instances corresponding to the public IP address. For example, referring to FIG. 1, public IP address 115 in a packet's destination address may be translated to private IP address 150. Private IP address 150 may in turn correspond to resource instance 130, which is mapped to public IP address 115. Moreover, a connection may be established to public IP address 115 using private IP address 150 corresponding to resource instance 130.

Referring to FIG. 5, operation 500 begins the operational procedure. Operation 500 may be followed by operation 502. Operation 502 illustrates translating a first IP address in a packet received from a first network to one of a plurality of second IP addresses on a second network. In an embodiment, an IP address on a first network (e.g., public IP address 115 in FIG. 1) may be translated to a first one of a plurality of IP addresses on a second network (e.g., private IP address 150 in FIG. 1). Each of the plurality of IP addresses on the second network may correspond to respective resource instances (e.g., resource instances 130 and 140 in FIG. 1).

Operation 502 may be followed by operation 504. Operation 504 illustrates maintaining the plurality of resource instances and a plurality of network interface records. As discussed above, the network interface records may comprise a second IP address on the second network. Furthermore, the second IP address may be associated with one of the plurality of resource instances so that the resource instance is enabled to receive data packets addressed to the second IP address of the associated network interface record through an associated network interface object.

Operation 504 may be followed by operation 506. Operation 506 illustrates receiving a request to change the association of a selected one of the network interface records from a first resource instance to a second resource instance.

Operation 506 may be followed by operation 508. Operation 508 illustrates determining if the network interface record is an existing record. If the network interface record does not exist, then operation 508 may be followed by operation 510 in which the network interface record is created.

If the network interface record is an existing record, then operation 508 may be followed by operation 512. Operation 512 illustrates preventing the first resource instance from receiving traffic addressed to an IP address of the selected network interface record through a first network interface object. Operation 512 may be followed by operation 514. Operation 514 illustrates associating the selected network interface record with the second resource instance so that the second resource instance is enabled to receive traffic addressed to the IP address of the selected network interface record through a second network interface object. Operation 514 may be followed by operation 502.

Figure 6:
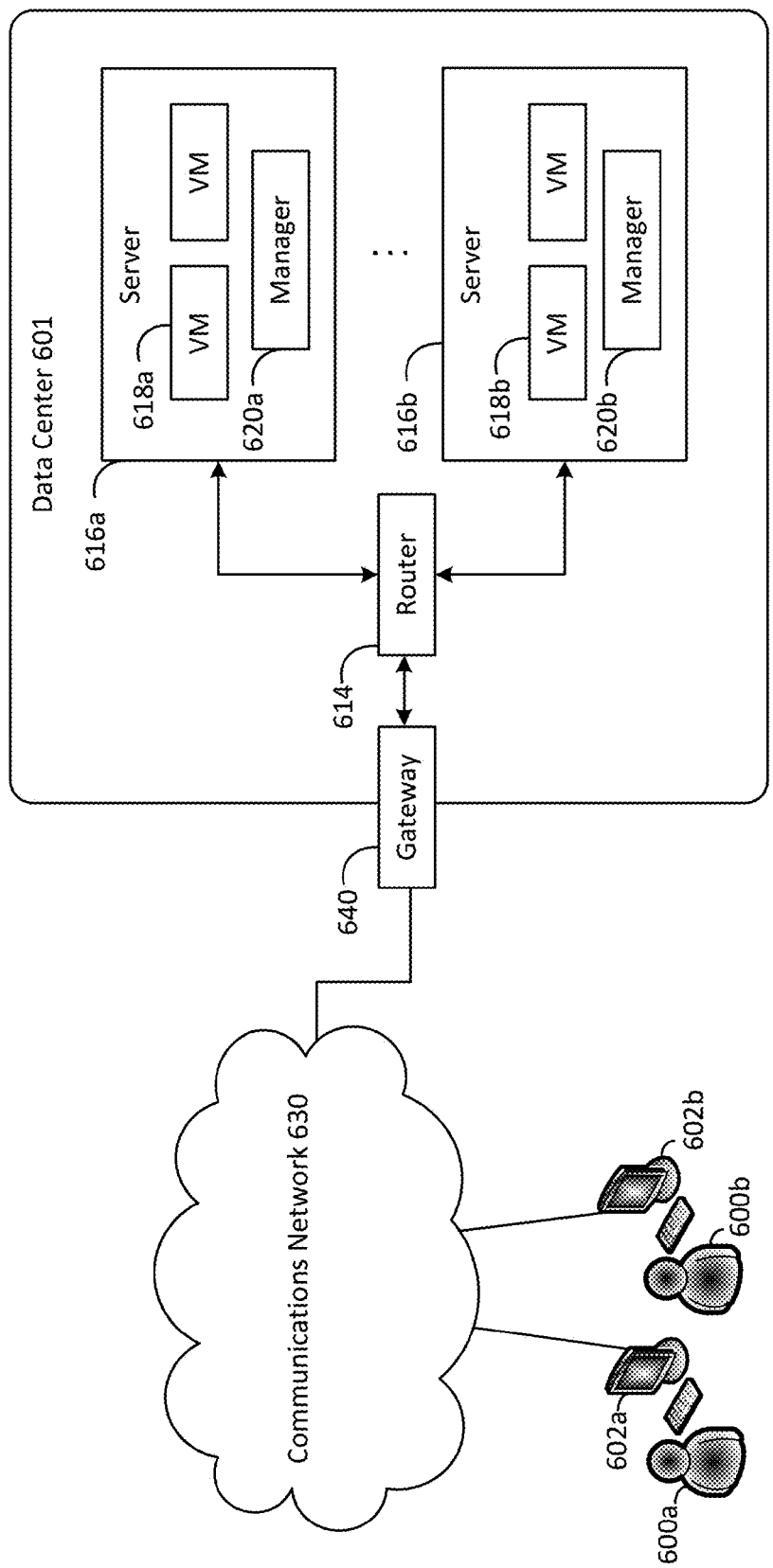
FIG. 6 is a diagram illustrating an example computer system that may be used in some embodiments.

FIG. 6 illustrates an example computing environment in which the embodiments described herein may be implemented. FIG. 6 is a diagram schematically illustrating an example of a data center 601 that can provide computing resources to multiple users 600 by way of computers 602 via a communication network 630. Data center 601 may be configured to provide computing resources for executing applications on a permanent or an as-needed basis. The computing resources provided by data center 601 may include various types of resources, such as data processing resources, data storage resources, data communication resources, and the like. Each type of computing resource may be general-purpose or may be available in a number of specific configurations. For example, data center 601 may include servers 616 that provide computing resources available as virtual machine instances 618. The virtual machine instances 618 may be configured to execute applications, including Web servers, application servers, media servers, database servers, and the like. Other resources that may be provided include data storage resources (not shown), and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMWare or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by customers 600 or other customers of data center 160. For instance, user computer 602a or 602b may be a server, a desktop or laptop personal computer, a tablet computer, a wireless telephone, a personal digital assistant (PDA), an e-book reader, a game console, a set-top box, or any other computing device capable of accessing data center 601. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 601. In this regard, data center 601 might provide a Web interface through which aspects of its operation may be configured through the use of a Web browser application program executing on user computer 602. Alternatively, a stand-alone application program executing on user computer 602 might access an application programming interface (API) exposed by data center 601 for performing the configuration operations. Other mechanisms for configuring the operation of the data center 601, including deploying updates to an application, might also be utilized.

Servers 616 shown in FIG. 6 may be standard servers configured appropriately for providing the computing resources described above and may provide computing resources for executing one or more applications. In one embodiment, the computing resources may be virtual machine instances 618. In the example of virtual machine instances, each of the servers 616 may be configured to execute an instance manager 620a or 620b capable of executing the virtual machine instances. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 601 shown in FIG. 6, a router 614 may be utilized to interconnect the servers 616a and 616b. Router 614 may also be connected to gateway 640 which is connected to communications network 630. Router 614 may manage communications within networks in data center 601, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 618 of data center 601 may form part of one or more networks. In some embodiments, gateway 640 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 618 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 640 may operate to manage both incoming communications to data center 601 from communication network 630 and outgoing communications from data center 601 to communication network 630. For example, if virtual machine instance 616a sends a message (not shown) to computer 602a, virtual machine instance 618a may create an outgoing communication that includes network address on a first network (e.g., an external public IP address) for computer 602a as the destination address and include a network address on a second network (e.g., a private IP address) for virtual machine instance 618a as the source network address. Router 614 may then use the destination address of the outgoing message to direct the message to gateway 640 for handling. In particular, in order to allow computer 602a to reply to the outgoing message, gateway 640 may temporarily map one of the public network addresses for data center 601 to virtual machine instance 618a and modify the outgoing message to replace the private network address for the source network address with the mapped public network address. Gateway 640 may then update its mapping information with the new mapping, and forward the modified outgoing message to computer 602a over the Internet.

If computer 602a responds to the modified outgoing message by sending a response incoming message (not shown) that uses the mapped public network address for virtual machine instance 618a as the destination network address, the response incoming message may be directed over the Internet to gateway 640. Gateway 640 may then perform similar processing in reverse to that described above for the outgoing message. In particular, gateway 640 may use its mapping information to translate the mapped public network address into the private network address of virtual machine instance 618a, modify the destination network address of the response incoming message from the mapped public network address to the private network address of virtual machine instance 618a, and forward the modified incoming message to virtual machine instance 618a. In this manner, at least some of the internal computers of data center 601 may communicate with external computing systems via temporary use of the public network addresses. Furthermore, in some situations, one or more of the internal computing systems of data center 601 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 601 described in FIG. 6 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising at least one computing node and at least one data store in communication with the at least one computing node, the at least one data store having stored therein computer instructions, that upon execution by the at least one computing node, cause at least one the computing node at least:
   translating IP addresses in packets received from a first network to IP addresses on a second network, the IP addresses on the second network corresponding to resource instances on the second network corresponding to the IP addresses received from the first network;
   maintaining a plurality of network interface records having stored thereon IP addresses on the second network associated with corresponding ones of the resource instances on the second network, wherein the resource instances are enabled to receive data packets translated to IP addresses on the second network and stored on the network interface records, wherein the IP addresses on the second network correspond to associated network interface objects that are associated with corresponding ones of the resource instances on the second network;
   in automatic response to a request to change an association of a selected one of the IP addresses on the second network from a first resource instance to a second resource instance:
      preventing the first resource instance from receiving traffic translated to the selected IP address through a network interface object associated with the first resource instance;
      changing the association of the first network interface object to the second resource instance so that the second resource instance is enabled to receive traffic translated to the selected IP address through the network interface object associated with the first resource instance without remapping the selected IP address on the second network with mapped IP addresses on the first network; and
      allowing delivery of packets received from the first network and addressed to the selected IP address to be delivered to the second resource instance based on its association with the first network interface object.

2. The system according to claim 1, wherein the network interface records comprise a subnet identifier of a subnet containing the network interface record's IP address.

3. The system according to claim 1, wherein the network interface records comprise a set of security properties.

4. The system according to claim 3, wherein the second resource instance is enabled to receive data packets through the second network interface object in accordance with a set of security properties as indicated in a network interface record associated with the second network interface object.

5. The system according to claim 1, wherein:
- services provided by the first resource instance to computers on the first network are provided by the second resource instance; and
- said preventing, associating, and causing are performed without interruption of the services.

6. A computer-implemented method for managing computing resources, the method comprising:
- translating IP addresses in packets received from a first network to IP addresses on a second network, the IP addresses on the second network corresponding to resource instances on the second network corresponding to the IP addresses received from the first network;
- maintaining a plurality of network interface records having stored thereon IP addresses on the second network associated with corresponding ones of the resource instances on the second network, wherein the resource instances are enabled to receive data packets translated to IP addresses on the second network and stored on the network interface records, wherein the IP addresses on the second network correspond to associated network interface objects that are associated with corresponding ones of the resource instances on the second network;
- receiving, by a computing device, a request to change an association of an IP address from a first resource instance to a second resource instance, the first resource instance associated with a network interface record including the IP address and a first network interface object attached to the first resource instance;
- in automatic response to receiving the request, disallowing, by the computing device, the first resource instance from receiving data packets addressed to the IP address through the first network interface object attached to the first resource instance;
- updating, by the computing device, the network interface record to associate the IP address with the second resource instance so that the second resource instance is enabled to receive traffic translated to the IP address through the network interface object associated with the first resource instance without remapping the IP address; and
- attaching the second resource instance with a second network interface object so that the second resource instance is enabled to receive data packets addressed to the IP address through the second network interface object attached to the second resource instance.

7. The method of claim 6 further comprising causing translation of IP addresses in packets received from the first network and addressed to the IP address of the first resource instance to be translated to the IP address of the second resource instance.

8. The method of claim 6, wherein the network interface record further comprises a subnet identifier of a subnet containing the IP address.

9. The method of claim 6, wherein the network interface record comprises a set of security properties including a first authorization entry identifying one or more entities authorized to submit a request to update the network interface record.

10. The method of claim 9 wherein the set of security properties includes a second authorization entry identifying one or more entities authorized to modify the first authorization entry.

11. The method of claim 7, wherein:
- services provided by the first resource instance to computers on the first network are provided by the second resource instance; and
- said disallowing, updating, attaching, and causing are performed without interruption of the services.

12. The method of claim 7, wherein the network interface records comprise a set of security properties.

13. The method of claim 12, wherein the second resource instance is enabled to receive data packets addressed to the IP address through the second network interface object in accordance with a set of security properties indicated in a network interface record associated with the IP address.

14. A non-transitory computer-readable storage medium having stored thereon computer-readable instructions, the computer-readable instructions comprising instructions that upon execution on a computing node, at least cause:
- translating network addresses in packets received from a first network to network addresses on a second network, the network addresses on the second network corresponding to resource instances on the second network corresponding to the network addresses received from the first network;
- maintaining a plurality of resource instances and a plurality of network interface records, the network interface records storing thereon network addresses associated with the resource instances so that the resource instances are enabled to receive data packets addressed to the network addresses through associated network interface objects;
- in automatic response to a request to change the association of a selected network address from a first resource instance to a second resource instance:
- preventing the first resource instance from receiving traffic translated to the selected network address through a network interface object associated with the first resource instance;
- updating the network interface record associated with the first resource instance so that the second resource instance is enabled to receive traffic addressed to the selected network address through a network interface object associated with the second resource instance without remapping the selected network address; and
- causing packets addressed to the network address to be delivered to the second resource instance via the network interface object associated with the second resource instance.

15. The non-transitory computer-readable medium of claim 14 wherein the network interface records comprise a set of security properties.

16. The non-transitory computer-readable medium of claim 14 wherein the network interface records comprise a subnet identifier of a subnet containing the network interface record's network address.

17. The non-transitory computer-readable medium of claim 14, wherein:
- services provided by the first resource instance to computers on another network are provided by the second resource instance; and
- said updating and causing are performed without interruption of the services.

18. The non-transitory computer-readable medium of claim 14 wherein the plurality of network interface records are maintained by a network interface virtualization service.

* * * * *